United States Patent [19]

Sheets

[11] 3,831,437
[45] Aug. 27, 1974

[54] APPARATUS FOR SQUEEZE TESTING CONTAINERS

[75] Inventor: Richard S. Sheets, Elmira, N.Y.

[73] Assignee: Powers Manufacturing Inc., Elmira, N.Y.

[22] Filed: Jan. 11, 1973

[21] Appl. No.: 322,663

[52] U.S. Cl. .................................................. 73/94
[51] Int. Cl. ............................................ G01n 3/08
[58] Field of Search ........................ 73/94, 88 R, 12

[56] References Cited
UNITED STATES PATENTS

| 3,197,013 | 7/1965 | Van Der Winden | 198/167 X |
| 3,618,370 | 11/1971 | Dubble | 73/88 R |
| 3,702,563 | 11/1972 | Brady et al. | 73/12 |

Primary Examiner—Jerry W. Myracle
Attorney, Agent, or Firm—Seidel, Gonda & Goldhammer

[57] ABSTRACT

An apparatus for squeeze testing glass containers on a production line basis. The apparatus includes a squeeze wheel and a reaction wheel which are disposed in spaced side-by-side relation above a conveyor which moves the containers into a test zone between the wheels. One of the wheels is supported in part by resilient means so that it yields as the containers pass through the test zone while a squeezing pressure of predetermined magnitude is applied. Both round and non-round containers can be tested.

16 Claims, 8 Drawing Figures

APPARATUS FOR SQUEEZE TESTING CONTAINERS

This invention relates to an apparatus for testing glass containers to locate those containers which have structural defects therein, and more particularly to an apparatus for testing glass containers by squeezing them at a predetermined pressure.

It is of vital importance that glass containers having structural defects be discovered before they are filled or reach the marketplace.

The application of a squeezing force across the cylindrical cross section of a typical glass container creates a predictable stress pattern both on the inside surfaces and outside surfaces. In non-round containers the stress pattern is not easily predictable and the stress levels required must be determined empirically. Glass is exceptionally strong in compression and much weaker in tension. The stress pattern generated by the squeezing forces generates both compression and tension on both the internal and external surfaces which result in failure by fracture of containers having defects oriented to stress pattern developed.

The invention described herein generally relates to an apparatus for squeeze testing containers which comprises an endless member and a surface. The endless member and surface are disposed in side-by-side spaced relation over a conveyor to define a test zone therebetween. Means are provided for driving the endless member in the direction that containers move through the test zone. Means are provided for resiliently urging the endless member toward the surface so that containers passing between the surface and the endless member are squeezed as they pass through the test zone.

Additionally, the invention also relates to an overload detector which is operative to move the endless member away from the surface so that the materials causing the overload can be moved through the test zone.

Furthermore, the invention relates to a cover for covering containers in the test zone so that particles of glass from containers which are fractured in the test zone do not enter the mouth of adjacent containers.

For the purpose of illustrating the invention, one presently preferred form thereof is shown in the drawings. It is to be understood, however, that the invention is not limited to the precise arrangements and instrumentalities shown and wherein.

Figure 1:
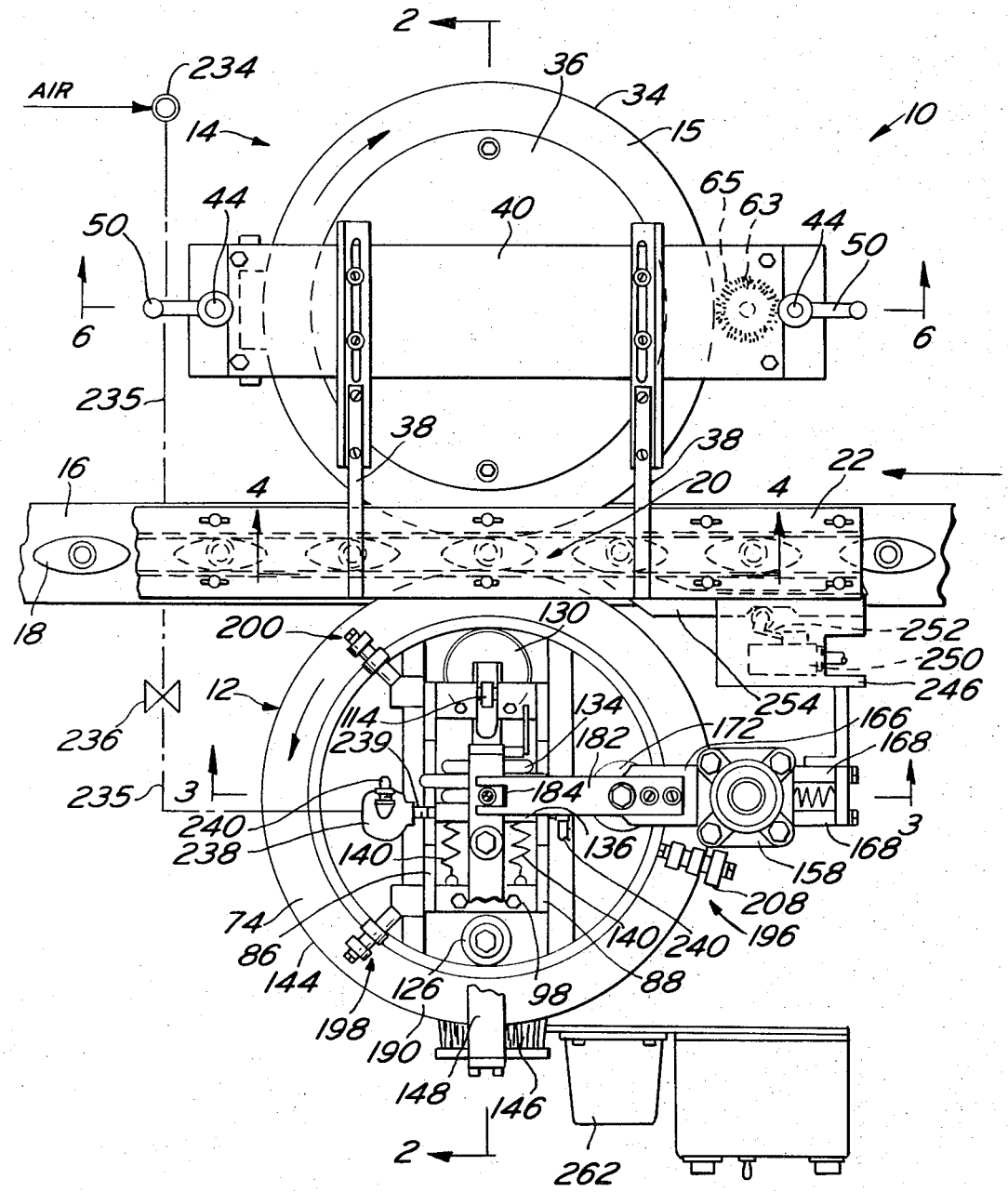
FIG. 1 is a plan view of the squeeze testing apparatus.
Figure 2:
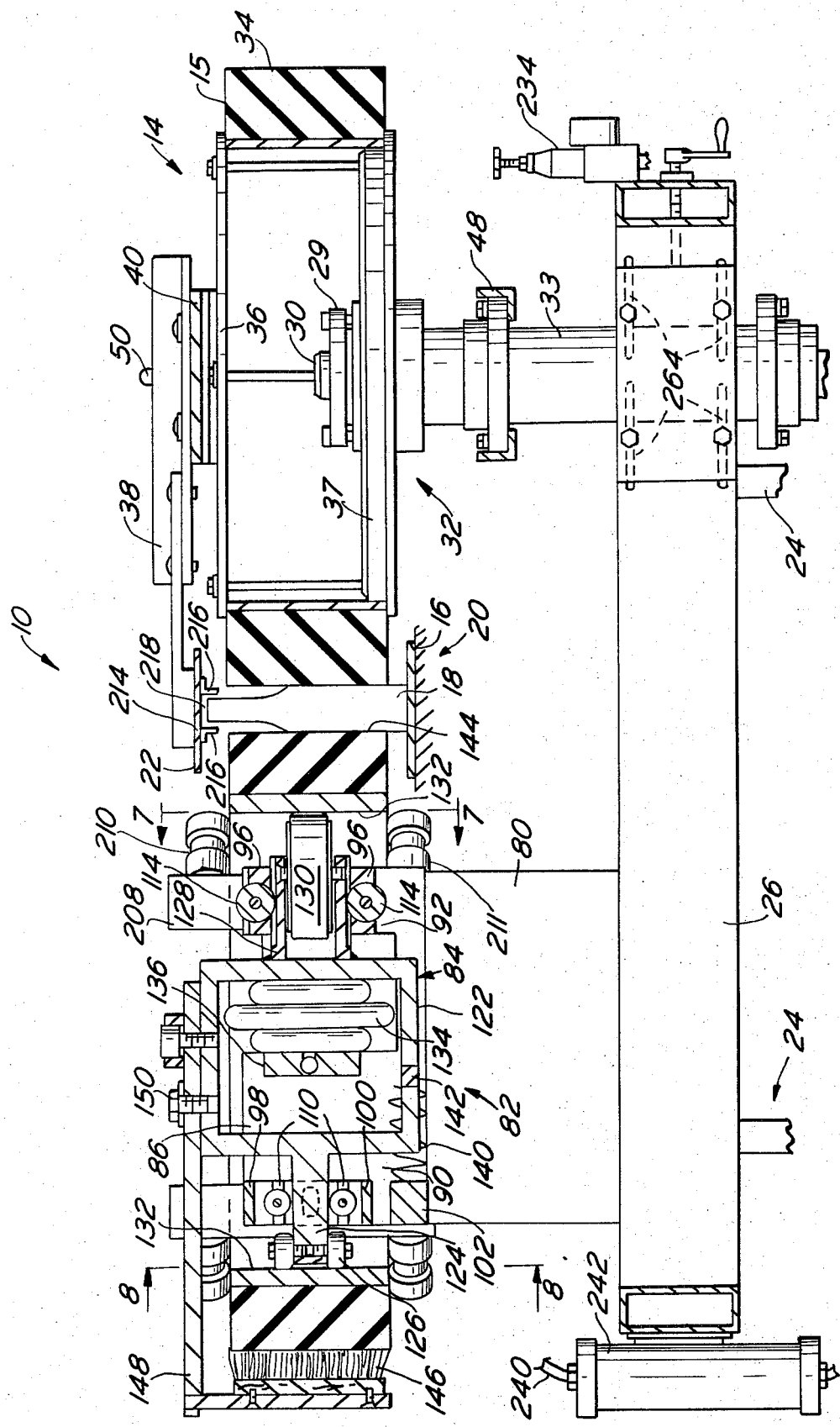
FIG. 2 is a sectional view taken along line 2—2 of FIG. 1.

The invention can best be described by referring to FIGS. 1 and 2 wherein a squeeze tester 10 constructed in accordance with the invention is illustrated.

The squeeze tester comprises first and second endless means 12 ans 14. Both the first and second endless means are illustrated as wheels. It is not essential that they be wheels since any other endless configuration is suitable to accomplish the object of the invention. Nevertheless, for clarity, they will both be identified as wheels throughout the specification. Thus, wheel 12 may be characterized as a squeeze wheel and wheel 14 may be characterized as a reaction wheel.

Both the squeeze wheel and the reaction wheel are mounted for rotation in a horizontal plane in side-by-side spaced relation over a conveyor 16 which is operative to bring containers 18 into a test zone 20 defined therebetween. A cover 22 for containers in the region of the test zone is mounted in overlying relation to the conveyor.

As seen in FIG. 2, the squeeze tester 10 is mounted on a base 24 which includes a plurality of horizontally extending beams 26 (only one of which is shown). The base is positioned beneath the conveyor 16 so that the squeeze and reaction wheels 12 and 14 are disposed on either side of the longitudinal axis of the conveyor.

The reaction wheel 14 may be an annulus 15 comprised of a suitable hard elastomer such as polyurethane. Annulus 15 is supported by a hub assembly 32. The hub assembly is fixed to the upper end of shaft 30 by a collar 29. The shaft 30 is rotatably supported in shaft housing 33. The height of the hub can be adjusted by displacing bearing collar 35 longitudinally of the shaft. The bearing collar, which is held in position by a set screw, is supported by a second collar at the top of shaft housing 33. The hub is covered by a plate 36 which cooperates with the second plate 37 to support annulus 15. The annulus 15 has a peripheral bearing surface which is operative to engage and support a container which is squeezed as it passes through test zone 20.

Cover 22 is carried by support members 38 which extend from an elongated plate 40 (FIG. 2) which overlies reaction wheel 14. At each of its ends the plate is connected to an inverted L-shaped bracket 42 which is supported by collars 43 on threaded shafts 44. Each threaded shaft 44 is received in a nut 46 on a horizontally disposed plate 48. Plate 48 is supported by the base and extends transversely of wheel 14. The threaded shafts 44 can be rotated by hand cranks 50 to raise and lower the cover 22.

Figure 6:
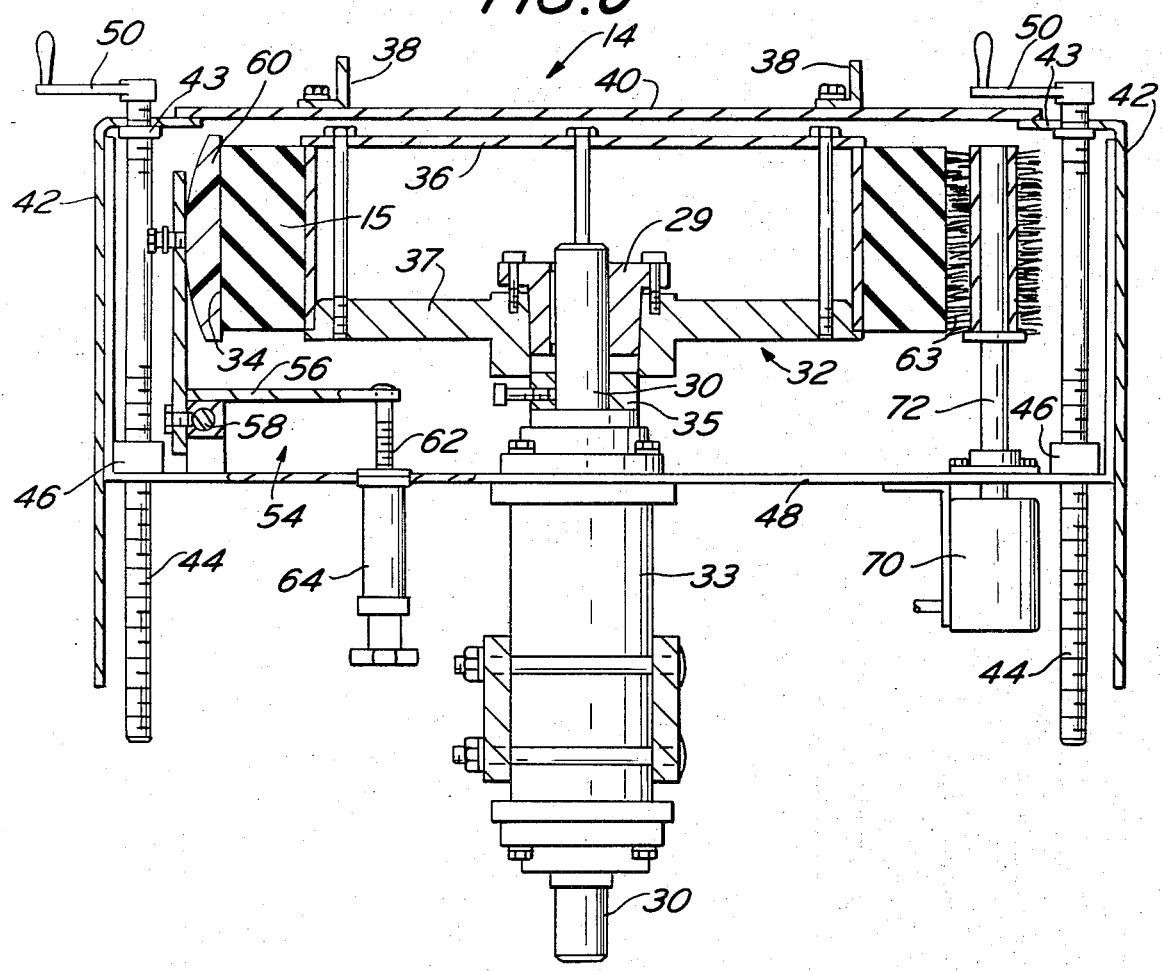
FIG. 6 is a sectional view taken along line 6—6 of FIG. 1.

As seen in FIG. 6, a brake 54 is operative to prevent rotation of reaction wheel 14. The brake comprises an "L"-shaped member 56 which is pivotally connected by a pin 58 to plate 48. One of the legs of member 56 supports a brake shoe 60. The other leg supports a downwardly directed threaded shaft 62 which is received in threaded housing 64 on plate 48. As shaft 62 is advanced or withdrawn through the housing 64, the brake shoe 60 is respectively brought into engagement and disengaged from surface 34 of the annulus 15.

The reaction wheel may be freely rotatable or it may be driven. When it is driven, a slip drive such as that obtained by a rotatable wire brush 63 having bristles 65 is preferred. The wire brush is mounted on motor shaft 72 so that the bristles are in driving engagement with surface 34. Rotation of the brush may be accomplished by an air motor 70 mounted on plate 48. However, since there is only frictional engagement between the wire brush 63 and surface 34, in the event that the wheel should not rotate as, for example, if it should be subjected to a jam up or overload, or if the brake 54 were inadvertently applied, the motor would continue to rotate with the wire brush 64 merely slipping past surface 34. The slip drive and brake 54 present a relationship that is particularly useful in the testing of round containers. This relationship is described in detail herein.

Squeeze wheel 12 may be an annulus 74 comprised of a suitable hard elastomer such as polyurethane. It is mounted on base 24 for rotation in a horizontal plane along side reaction wheel 14. It rotates in the direction in which conveyor 16 moves the containers through the test zone 20. Its support permits it to move transversely of the conveyor to yield when a container having a size greater than the distance between wheels 12 and 14 enters the test zone.

To this extent, the beams 26 carry a support 80. The support 80 in turn carries a first guide means 82 which supports a second guide means 84 (FIG. 2). The second guide means 84 is mounted on the first guide means 82 for movement toward and away from the reaction wheel 14. The squeeze wheel 12, which is supported on the second guide means, moves with the second guide means so that the squeeze wheel can squeeze a container in the test zone 20. The movement of the second guide means is achieved by suitable resilient means which are described in detail herein.

The first guide means 82 comprises identical spaced upright plates 86 and 88 (FIGS. 1, 2, 7 and 8). As seen in FIG. 2, plate 86, which is typical, is generally U-shaped having spaced first and second upwardly extending legs 90 and 92.

Figure 7:
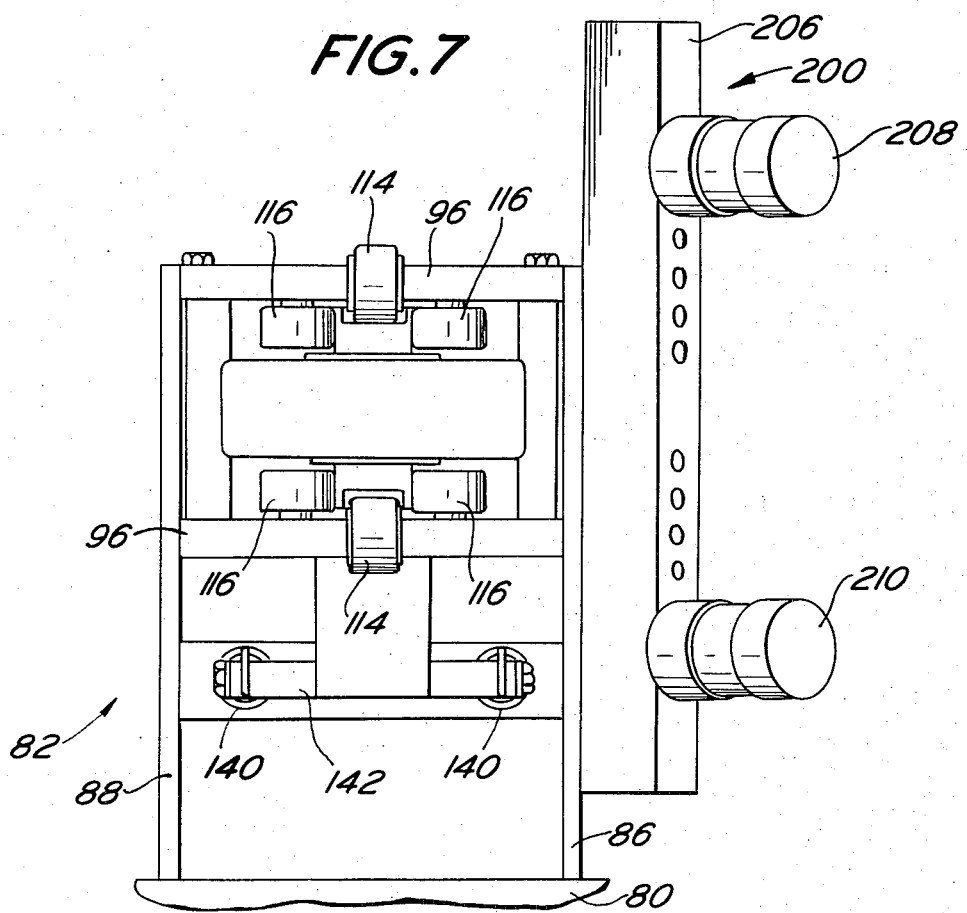
FIG. 7 is a sectional view taken along line 7—7 of FIG. 2.
Figure 8:
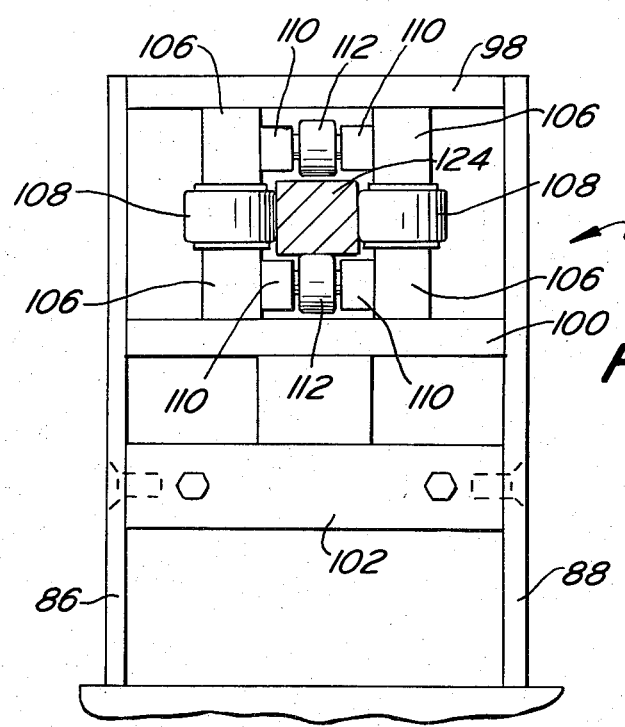
FIG. 8 is a sectional view taken along line 8—8 of FIG. 2.

Legs 92 are connected by horizontally extending bars 96 (FIG. 7). Legs 90 are connected by horizontally extending bars 98, 100 and 102 (FIG. 8).

Vertical posts 106 which are supported by horizontal bars 98 and 100 carry guide rollers 108 which rotate in a horizontal plane. Horizontal posts 110 which are supported in spaced relation by posts 106 carry guide rollers 112 which rotate in a vertical plane.

The guide rollers 108 and 112 define an opening.

As seen in FIG. 7, horizontal bars 96 support guide rollers 114 for rotation in a vertical plane. Additionally, each of these bars supports two rollers 116 for rotation in a horizontal plane. The rollers 114 and 116 define an opening that cooperates with the opening defined by rollers 108 and 112 in a manner which will be described.

The second guide means 84 is supported and guided by rollers 108, 112, 114 and 116 for movement transversly of the conveyor 16.

As best seen in FIG. 2, the second guide means comprises a generally rectangular frame 122 which is supported between the upright plates 86 and 88. It includes an outwardly extending bar 124 which is slidably received in the opening defined by the guide rollers 108 and 112 (FIG. 8). At its free end, bar 124 supports guide means which are operative to bear against the interior wall 132 of the squeeze wheel 12. As illustrated in the drawings, the guide means may comprise rollers 126.

At its opposite end, the rectangular frame 122 supports an outwardly extending bracket 128. The bracket is slidably received in the opening defined by the guide rollers 114 and 116 (FIG. 7). At its free end, bracket 128 supports a bearing wheel 130 which is mounted for rotation in a horizontal plane so that it can bear against the interior wall 132 of wheel 12.

The second guide means 84 reciprocable within the first guide means 82. Its movement is controlled by the various guide rollers 108, 112, 114 and 116 described above.

The movement between the first and second guide means is controlled by oppositely directed yieldable resilient members. One of the members may be an expandable air bag 134 having oppositely expanding walls. One wall is fixed to rectangular frame 122. The opposite wall is fixed to legs 90 by a conduit housing 136 that extends therebetween.

Expansion of air bag 134 displaces the second guide means and the squeeze wheel 12 toward the reaction wheel 14.

The member urging the second guide means away from the conveyor may comprise first and second helical tension springs 140. The springs are fixed to the second guide means by a horizontally extending bracket 142 (FIG. 7) which has a spring secured to each end thereof. The other end of each spring is secured to the aforementioned horizontal bar 102 on the first guide means 82. Thus, when the air bag is deflated, the springs 140 move the second guide means and the squeeze wheel away from the reaction wheel.

Suitable means may be provided for removing glass particles and the like from the peripheral bearing surface 144 of squeeze wheel 12. Such means may comprise a stiff brush 146 which extends the entire width of bearing surface 144. The brush may be supported by a generally "L"-shaped bracket 148 which is secured by fasteners 150 to rectangular frame 122. While not illustrated, a similar brush may be mounted against the peripheral bearing surface 34 of the reaction wheel 14. As will be apparent, the wire brush 63 may also serve to remove glass particles from the surface of the reaction wheel.

As is apparent from FIGS. 1 and 2, the brush 146 moves with the second guide means 84 in response to expansion of the air bag 134.

Figure 3:
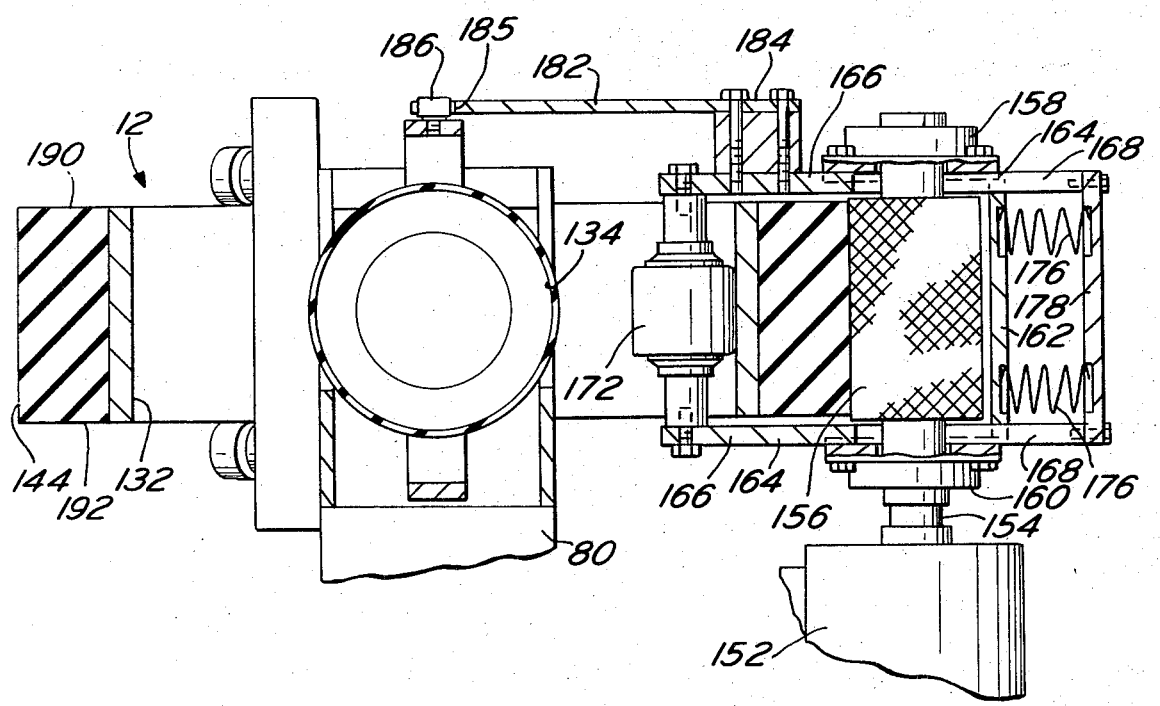
FIG. 3 is a sectional view taken along line 3—3 of FIG. 1.

The squeeze wheel 12 is driven by a motor which is connected to a gear reduction box 152 (FIG. 3). The gear reduction box has an upwardly extending shaft 154 which supports a drive roller 156 having a knurled surface.

The shaft 154 supports upper and lower generally rectangular bearing blocks 158 and 160 for relative rotation therewith above and below rollers 156. The bearing blocks 158 and 160 are separated by a plurality of vertically extending plates 162 (only one of which is shown). The plates enclose the roller 156 on the sides away from squeeze wheel 12 so that the rotating roller is not a safety hazard.

As seen in FIGS. 1 and 2 each bearing block 158, 160 supports track means 164 which comprise an elongated plate 166 with two spaced rearwardly directed rails 168. As seen in FIG. 3, openings in each of the bearing plates 158 and 160 permit them to be slipped over the rails with shaft 154 free to rotate therebetween.

Plates 166 support a pressure roller 172 which bears against the interior peripheral surface of wheel 12.

Means are provided for urging the drive roller 156 into driving engagement with the outer peripheral surface 144. In the presently preferred form of the invention the means comprise helical compression springs 176 which are interposed between one of the plates 162 and a plate 178 which is supported at its ends by rails 168. A frame is defined by roller 172, track means 164 and plate 178. Springs 176 are operative to urge the drive roller 156 toward wheel 12 while the roller 172 and plate 178 are fixed with respect thereto.

Frame 122 is connected to the track means 164 so that displacement of the second guide means causes roller 156 to move through an arc which corresponds to that displacement so that the squeeze wheel cannot cock on the second support means. This is accomplished by a bar 182 which is connected by a suitable means 184 to the upper plate 166 on track means 164. The bar 182 has a slot 185 in its free end which receives a pin 186. The pin in turn is anchored to frame 122. Thus, movement of the frame causes the bar 182 to rotate about an axis defined by shaft 154 so that the bearing roller 172 is displaced through an arc about that shaft when the squeeze wheel is moved transversely of the conveyor 16.

The upper and lower surfaces 190 and 192 of squeeze wheel 12 may be supported and guided at a plurality of circumferentially spaced stations. In the embodiment illustrated, squeeze wheel 12 is supported at three locations by suitable guide roller installations 196, 198 and 200.

Since guide roller installations 198 and 200 are identical, only installation 200 will be described. It comprises an elongated vertical post 206 secured to plate 86 on the first guide means. The post supports upper and lower banks of rollers 208 and 210. The banks of rollers are arranged on shafts so that their axes of rotation lie along radii of squeeze wheel 12. Means may be provided for adjusting the rollers so that they can accommodate wheels of varying heights.

Guide roller installation 196 comprises an elongated vertical post 208 which is mounted on one of the plates 162. It supports upper and lower banks of rollers 210 and 211. The banks of rollers are arranged on shafts so that their axes of rotation lie along a radius of squeeze wheel 12.

Figure 4:
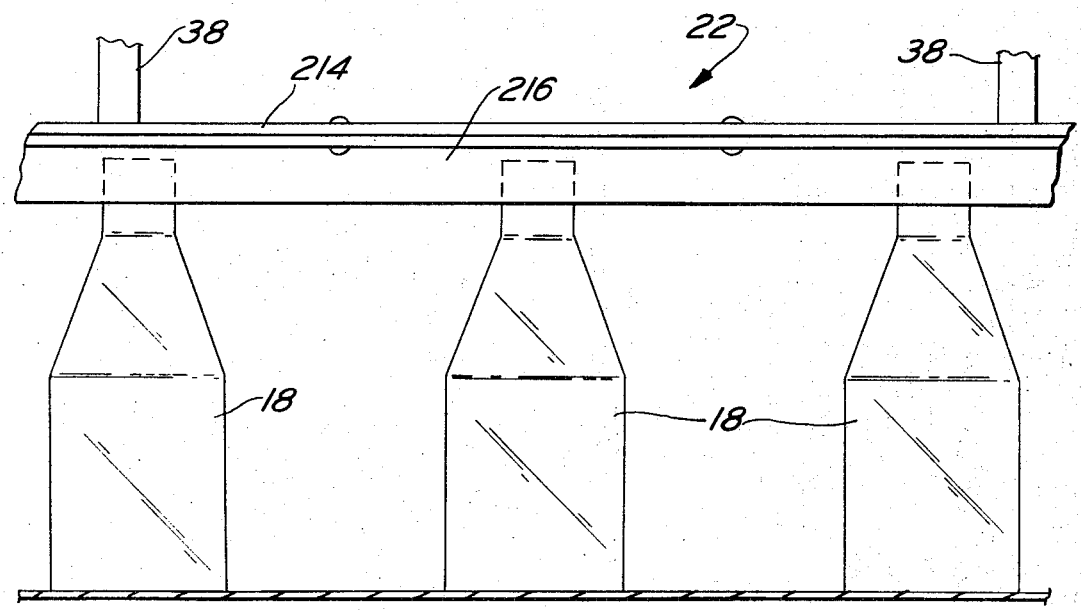
FIG. 4 is a sectional view taken along line 4—4 of FIG. 1 and shows one form of cover.

In FIGS. 2 and 4, one form of cover 22 is shown. The cover comprises an elongated plate 214 which overlies the test zone and the regions immediately preceding and following it. Two angles 216 are secured to the plate in side-by-side relation so that a channel 218 is formed therebetween. The cover 22 is raised and lowered by cranks 50 so that it overlies the mouths of the containers 18 as they pass through the test zone. In the event that a container should fail, the cover will prevent particles of glass from flying into adjacent containers.

Figure 5:
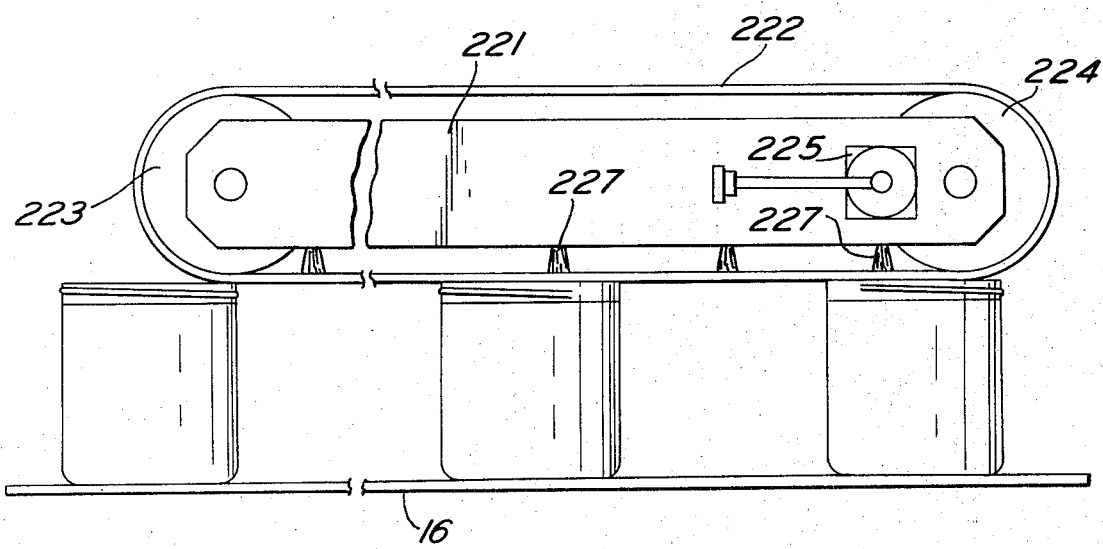
FIG. 5 is a sectional view similar to FIG. 4, but showing a different form for the cover.

While the cover illustrated in FIGS. 2 and 4 is particularly suitable for containers having narrow mouths, for containers having wider mouths, the cover illustrated in FIG. 5 is preferred. This cover comprises a frame 221 which supports an endless belt 222. The endless belt overlies the test zone and the regions immediately preceding and following it. It presents a smooth surface for overlying the mouths of the containers. The belt is wrapped around an idler pulley 223 and a drive pulley 224. The drive pulley is connected to an air motor 225 through a series of reduction gears (not shown). The air motor may be provided with suitable means for controlling the linear speed of the belt so that it is the same as the speed of the conveyor 16.

Means such as bristles 227 are provided for resiliently urging the lower flight 226 of the belt into engagement with the containers so that their mouths are sealed.

Pressurized air for air bag 134 may be obtained from a suitable source of compressed air which passes through a pressure control in the form of regulator 234 where its pressure is adjusted as desired. The compressed air is conducted by a suitable conduit 235 to a solenoid actuated air valve 236 which in turn is connected to a pressure dump valve 238.

Valve 238 has two outlet conduits. Conduit 239 is connected to the air bag at conduit housing 136. Conduit 240 is vented to the atmosphere. The conduits 235 and 240 selectively communicate with conduit 239 in response to the pressure therein. As valves having this characteristic are well known, and since its operating features do not form a part of the invention, it will not be described in any more detail.

An air reservoir tank 242 on beam 26 is connected to the air bag by a conduit 240 to increase its capacity. The importance of reservoir 242 depends upon the deflection of the air bag rlative to its internal volume when a container passes through the test zone.

Thus, it is apparent that for the system illustrated in the drawings, the use of the reservoir 242 permits a substantial amount of deflection of the air bag while only slightly compressing the air therein.

A container may fail or a portion of a container which has just failed in the test zone 20 could form an obstruction on the conveyor thereby blocking succeeding containers from entering the test zone. If this occurs, the build up of containers upstream of the test zone will be detected by the overload detection system.

The overload detection system comprises a bracket 246 secured to the gear reduction box 152 which supports a microswitch 250 having an operator 252.

The operator 252 bears against an elongated arm 254 which can be adjusted so that it overlies the conveyor. The arm 254 is pivotally connected to the underside of bracket 246 so that it rotates about its pivot the microswitch is actuated.

The microswitch 250 is electrically connected to the coil in the solenoid valve 236 and to a delay mechanism 262 illustrated schematically in FIG. 1. The circuitry by which this is accomplished forms no part of this invention. Thus it will not be described.

The squeeze test apparatus is installed about a conveyor which carries containers such as the bottles illustrated thereon. Typically, the test apparatus is downstream from other testing devices so that a series of tests can be performed in succession on the containers. Advantageously, spacing should be provided upstream from the squeeze tester so that containers entering the test zone are spaced sufficiently apart so as not to interfere with each other. Typically, such spacing is accomplished by an elongated screw which is mounted alongside the conveyor for rotation about its longitudinal axis. The containers are spaced in accordance with the pitch of the screw.

This test apparatus is operative to squeeze test both round containers and non-round containers.

A squeeze pressure of a predetermined value in pounds can be established as a function of pressure in the air bag and deflection of the squeeze wheel when a container passes through the test zone. Adjustment means such as horizontally disposed slots 264 may be provided for varying the spacing between wheels 12 and 14 to control the amount of deflection of the squeeze wheel. Thus to reduce the test pressure for a container of a given size, pressure in the air bag may be reduced by adjustment of regulator 234 or the distance between the squeeze and reaction wheel may be increased. To increase the test pressure, the pressure in the air bag may be increased or the squeeze and reaction wheels may be moved closer together. However, it is preferred that the test pressure be varied by varying the pressure in the air bag. This is because changing distance between the squeeze and reaction wheels effects the amount of container rotation in the test zone to the extent that it will not rotate a full half turn. The importance of container rotation is explained herein.

When round containers are tested, brake 54 (FIG. 6) may be engaged so that the reaction wheel 14 cannot rotate. Containers are then fed into the test zone at regular intervals by conveyor 16. As the containers pass through the test zone, they are rolled along the peripheral wall 34 of reaction wheel 12 which has been locked against movement by the brake. The deflection of the squeeze wheel can be adjusted so that a container will rotate through about 180° as it passes through the test zone. Since the container is round, every point on its circumference will be tested by diametric squeeze pressure.

However, in a preferred procedure for testing round containers the brake 54 (FIG. 6) is adjusted to permit a small displacement of the peripheral bearing surface 34 of the reaction wheel 14 under the force of the containers as they pass through the test zone. This is accomplished by adjusting the brake so that its retarding effect on the reaction wheel is sufficient to overcome the driving force of the wire brush 63. Thus, the reaction wheel is normally fixed so that the wire brush is operative to remove glass particles which may be embedded in its outer peripheral surface 34.

When a container passes through the test zone, the force that it applies to the reaction wheel is added to the force applied by the wire brush. The sum of these forces is sufficient to overcome the retarding force of the brake to permit a small displacement of the reaction wheel. The displacement is small enough so that the container rolls along the reaction wheel and rotates through about 180° as it passes through the test zone. Yet, due to the slight displacement of the reaction wheel a clean portion of its peripheral bearing surface is presented to the wire brush for removal of embedded glass particles.

A suitable displacement for the peripheral bearing surface has been found to be about one half inch. Such a displacement permits full testing of a container and incremental cleaning of the reaction wheel.

When non-round containers are tested, the reaction wheel 14 is free to rotate. It has been shown by tests that if the reaction wheel 14 is not moving when the non-round bottles enter the test zone they will not be engaged by the squeeze and reaction wheels. This will result in an overload at the entrance to the test zone. The reaction wheel may be rotated by air motor 70 (FIG. 6) or by other suitable means. In some instances, the wheel may initially be rotated manually with the continued movement of containers through the test zone being sufficient to continue such rotation. Rotation of the reaction wheel 14, either by air motor 70 or by movement of earlier containers through the test zone is sufficient to permit the passage of containers.

If containers should accumulate in the test zone, arm 254 will pivot and actuate microswitch 250. Actuation of the microswitch closes the solenoid valve 236. This cuts off the air pressure to the dump valve 238.

When this occurs, the dump valve 238 responds by connecting the air bag to conduit 240 thereby venting its contents and the contents of the reservoir to the atmosphere.

Since the air bag is not pressurized, the springs 140 operate to draw the second guide means 84 transversly away from the conveyor to open the test zone. This is accomplished as frame 120 moves from right to left in FIG. 2; being guided during such movement by the rollers in the first guide means 82.

Actuation of microswitch 250 also initiates the beginning of a timed interval by means of the suitable timing device illustrated schematically in FIG. 1 at 262. The timing device automatically de-energizes the solenoid valve 236 at the end of the predetermined interval. This pressurizes the system and permits the air bag 134 to inflate and thereby move the squeeze wheel into its operative position.

The overload detector may be connected to machines which are upstream from the squeeze test apparatus so that containers upstream will not be damaged. On the other hand, the conveyor continues to run so that objects which are obstructing the test zone can be conveyed downstream thereby.

While the test zone has been described as being created by a squeeze wheel and a reaction wheel, that any suitable means which are capable of applying the desired pressure to a container may be used. Thus, the squeeze wheel may comprise any endless member which is mounted for cyclical movement in the direction of container movement to define a squeezing surface. Accordingly, in addition to using an annulus as described herein, belts, or other comparable means can be employed.

When testing non-round containers, a reaction surface which is capable of moving with the containers being tested must be provided. Such a surface may be achieved by the outer periphery of an annulus such as that shown. On the other hand, it may also be achieved by a movable belt or equivalent structure.

When round containers are tested, the peripheral bearing surface of the reaction wheel should be fixed or slightly movable relative to the container movement through the test zone. Thus it may merely be a plate or other member which is fixed relative to the container so that the container rolls around its own axis as it passes through the test zone. Also it could be a belt or other member which is capable of a small displacement relative to the container.

The apparatus disclosed includes the advantages of each of the foregoing in providing test surfaces which are operative to test containers by squeezing them.

While the invention has been described with reference to one form thereof, it is apparent that many other forms and embodiments will be obvious to those skilled in the art in view of the foregoing description. Thus, the scope of the invention should not be limited by that description but rather, by the scope of the claims appended hereto.

I claim:

1. An apparatus for squeeze testing glass containers comprising support means, first and second endless means, each of said endless means being mounted on said support means for cyclical movement, said endless means being disposed in side-by-side relation, a test zone defined between said first and second endless means, conveyor means, said conveyor means being operative to support containers and bring them through said test zone, resilient means for biasing said first and second endless means toward each other to squeeze a container in said test zone, means for driving at least one of said endless means in the direction that said containers move through said test zone, means for removing glass particles from said other endless means, said removing means being operative to selectively drive said other endless means to bring a non-round container through said test zone.

2. An apparatus as defined in claim 1 wherein said selective means includes a means for applying a driving force to said other endless means and a means for applying a retarding force to said other endless means, said driving force being less than said retarding force, and the difference of said forces being less than the driving force applied to said other endless means by a container as it passes through said test zone so that said retarding force is overcome.

3. An apparatus as defined in claim 2 wherein said means for applying said driving force is a brush having bristles, means for driving said brush so that said bristles move into driving engagement with said other endless means, and said bristles are operative to remove glass particles from said other endless means.

4. An apparatus for squeeze testing glass containers which are on a conveyor comprising an endless member and a surface, said endless member and said surface to be disposed in side-by-side spaced relation over the conveyor to define a test zone therebetween, means for driving said endless member in the direction that containers move through said test zone, first and second guide means, said first guide means supporting said endless member, said second guide means supporting said first guide means for movement transversely of the path of said containers through said test zone, resilient means coupled to said first and second guide means, said resilient means being operative to urge said endless member against a container passing through said test zone, and means for driving said surface in the direction that containers move so that non-round containers can be moved through said test zone.

5. An apparatus as defined in claim 4 wherein said endless member is an annulus with inner and outer peripheral surfaces, said drive means comprising spaced first and second roller means with said annulus disposed therebetween, each of said roller means being in contact with one of said peripheral surfaces, means for rotating one of said rollers, and means for urging said rollers into engagement with their respective peripheral surfaces.

6. An apparatus for squeeze testing glass containers which are on a conveyor comprising first and second endless members, said first endless member and said second endless member to be disposed in side-by-side relation over the conveyor to define a test zone therebetween, means for driving said first endless member in the direction that containers move through said test zone, first and second guide means, said first guide means supporting said first endless member, said second guide means supporting said first guide means for movement transversely of the path of said containers through said test zone, resilient means coupled to the first and second guide means, said resilient means being operative to urge said endless member against a container passing through said test zone, said first endless member being an annulus with inner and outer peripheral surfaces, said drive means comprising spaced first and second roller means with said annulus disposed therebetween, each of said roller means being in contact with one of said peripheral surfaces, means for rotating one of said rollers, means for urging said rollers into engagement with their respective peripheral surfaces, and means for removing glass particles from said other endless member, said removing means being operative to selectively drive said other endless member to bring a non-round container through said test zone.

7. An apparatus as defined in claim 6 wherein said selective means includes a means for applying a driving force to said other endless member and a means for applying a retarding force to said other endless member, said driving force being less than said retarding force, and the difference of said forces being less than the driving force applied to said other endless member by a container as it passes through said test zone so that said retarding force is overcome.

8. An apparatus as defined in claim 7 wherein said means for applying said driving force is a brush having bristles, means for driving said brush so that said bristles move into driving engagement with said other endless member, and said bristles are operative to remove glass particles from said other endless member.

9. An apparatus for squeeze testing containers comprising first and second means disposed in spaced side-by-side relation, a test zone defined between said first and second means, conveyor means disposed below said first and second means for bringing containers between said first and second means to be squeeze tested, means for urging said first and second means toward each other to squeeze a container disposed therebetween, motor means for driving both of said first and second means in the direction that said containers move through said test zone, means overlying said container in the region of said test zone, said overlying means being positioned above said conveyor a sufficient distance to close the mouth of the container in the region of said test zone, said overlying means comprising an elongated member, endless means supported by elongated member, said endless means defining a surface for engagement with the mouths of the containers, and said endless means comprises means for resiliently urging said surface into engagement with the mouths of containers in said test zone.

10. An apparatus as defined in claim 9 including means for driving said endless means so that said surface moves in the same direction and at substantially the same speed as said conveyor.

11. An apparatus as defined in claim 9 wherein said means for resiliently urging said surface into engagement with the mouths of containers in said test zone comprise bristles.

12. Apparatus for squeeze testing round and non-round glass containers comprising support means, first and second endless means, each of said endless means being mounted on said support means for cyclic movement, said endless means being disposed in side-by-side relation, a test zone defined between said first and second endless means, conveyor means, said conveyor means being operative to support containers and bring them through said test zone, resilient means for biasing said first and second endless means toward each other to squeeze a container in said zone, motor means connectable to each of said endless means for driving both of said endless means in a direction so that the containers move through said test zone, first guide means coupled to said support means, second guide means coupled to said first guide means for movement toward and away from one of said endless means, said second guide means supporting the other endless means, said resilient means being energizable and being coupled to said first and second guide means and being operative to bias said second guide means toward said one endless means, and means for urging said second guide means away from said one endless means when said resilient means is deenergized.

13. An apparatus as defined in claim 1 including sensing means for sending a signal in response to an overload in said test zone, means for de-energizing said resilient means, and means operatively connected to said sensing means and said deenergizing means, said last named means being operative to actuate said de-energizing means in response to a signal from said sensing means.

14. Apparatus for squeeze testing round and non-round glass containers comprising support means, first and second endless means, each of said endless means being mounted on said support means for cyclic movement, said endless means being disposed in side-by-side relation, a test zone defined between said first and second endless means, conveyor means, said conveyor means being operative to support containers and bring them through said test zone, resilient means for biasing said first and second endless means toward each other to squeeze a container in said zone, motor means connectable to each of said endless means for driving both of said endless means in a direction so that the containers move through said test zone, said drive means including first rolling contact means for driving engagement with one of said endless means, track means mounted on said support means, said rolling contact means being slidably mounted on said track means for movement toward and away from said one endless means, and resilient means for urging said rolling contact means towards said one endless means.

15. Apparatus for squeeze testing round and non-round glass containers comprising support means, first and second endless means, each of said endless means being mounted on said support means for cyclic movement, said endless means being disposed in side-by-side relation, a test zone defined between said first and second endless means, conveyor means, said conveyor means being operative to support containers and bring them through said test zone, resilient means for biasing said first and second endless means toward each other to squeeze a container in said zone, motor means connectable to each of said endless means for driving both of said endless means in a direction so that the containers move through said test zone, sensing means for sensing an overload in said test zone, and means operatively connected to said sensing means for causing said first and second endless means to move away from each other in response to a signal from said sensing means.

16. Apparatus for squeeze testing round and non-round glass containers comprising support means, first and second wheels mounted on said support means for rotation about vertical axes, said wheels being disposed in side-by-side relation with a test zone between the peripheries of said wheels, conveyor means, said conveyor means being operative to support containers and bring them through said test zone, resilient means for biasing said first and second endless means toward each other to squeeze a container in said test zone, motor means connectable to each wheel for driving each wheel in a direction so that non-round containers move through said test zone on said conveyor means, and means for retarding movement of one wheel when round containers move through said test zone on said conveyor means.

* * * * *